United States Patent [19]
Fukumura et al.

[11] Patent Number: 5,834,052
[45] Date of Patent: Nov. 10, 1998

[54] PRODUCING ELECTRODE SHEET WITH MULTILAYER STRUCTURE BY SIMULTANEOUS MULTILAYER COATING

[75] Inventors: Kenichi Fukumura; Masashi Ishiyama; Seiji Ishizuka, all of Kanagawa, Japan

[73] Assignee: Fuji Photo Film Co., Ltd., Kanagawa, Japan

[21] Appl. No.: 759,715

[22] Filed: Dec. 6, 1996

[30] Foreign Application Priority Data

Dec. 11, 1995 [JP] Japan ................................. 7-321508

[51] Int. Cl.⁶ ..................................................... B05D 5/12
[52] U.S. Cl. ........................... 427/58; 427/294; 427/356; 427/358; 427/402; 427/420
[58] Field of Search ............................. 427/58, 294, 356, 427/358, 402, 420

[56] References Cited

FOREIGN PATENT DOCUMENTS 0 639 865 A1  10/1994  European Pat. Off. .
3126795 A1    7/1981   Germany .

Primary Examiner—Katherine A. Bareford
Attorney, Agent, or Firm—Sughrue, Mion, Zinn, Macpeak & Seas, PLLC

[57] ABSTRACT

A method for producing an electrode sheet having a multi-layer structure is disclosed, wherein two or more layers for an electrode sheet are simultaneously coated with a coating solution by using a coater.

14 Claims, 3 Drawing Sheets

PRODUCING ELECTRODE SHEET WITH MULTILAYER STRUCTURE BY SIMULTANEOUS MULTILAYER COATING

FIELD OF THE INVENTION

The present invention relates to a method for producing an electrode sheet having a mutilayer structure, and more specifically to a coating method for a nonaqueous secondary battery giving a high discharging potential, being excellent in the life stability, and showing a high safety, said method also having an improved productivity.

BACKGROUND OF THE INVENTION

In the case of occurring the necessity of making an electrode having a multilayer structure for improving the fundamental performance of a battery, in particular, the safety, etc., a method of accomplishing an electrode sheet having a multilayer structure by coating these layers one by one is usually employed. In this case, every coating of one layer, delivery/winding process must be required and thus the foregoing method is a coating method having a very bad efficiency.

Also, in the repeatedly coating method of layers one by one, an electrode cutting trouble caused by curling occurring in the drying process and undesirable troubles of layer-peeling caused by failure of adhesion between the layers, partial falling and partial cracking of the coated layers, etc., frequently occurred.

Furthermore, in the case of overcoating on a thick film such as a positive electrode, at successively coating the void of a film of a mixture of positive electrode material, the void must be replaced with a coating solution, and thus there is a problem that immediately after coating, air in the void portions becomes bubbles to form holes in the film of the overcoat, whereby a uniform overcoat film cannot be formed. By the film having the defect caused by the bubbles, the essential function is not sufficiently obtained and the dispersion of the battery performance becomes large.

SUMMARY OF THE INVENTION

The first object of this invention is to improve the conventional inefficient method for accomplishing an electrode sheet having a multilayer structure by repeatedly coating each layer through a delivering/winding process every coating of one layer and thereby to provide a coating method for simultaneously coating plural layers for an electrode sheet to greatly shorten the finishing time of an electrode sheet having a multilayer structure.

The second object of this invention is to restrain the trouble occurring in the drying process of repeatedly coating of layers one by one and thereby to provide a method for coating a multilayered electrode sheet composed of uniform films having no defect of film caused by bubbles.

It has now been discovered that the objects described above can be attained by carrying out simultaneous coating of two or more layers.

The preferred embodiments of the present invention are as follows but the invention is not limited by these embodiments.

That is, according to the 1st aspect of this invention, there is provided a method for producing an electrode sheet having a multilayer structure, which comprises simultaneously coating two or more layers for constituting the electrode sheet with a coating solution by a coater.

According to the 2nd aspect of this invention, there is provided the method for producing an electrode sheet having a multilayer structure of the 1st aspect, wherein the plural layers are simultaneously coated with a coating solution using an extrusion die having plural slots.

According to the 3rd aspect of this invention, there is provided the method for producing an electrode sheet having a multilayer structure of the 1st aspect, wherein the plural layers are simultaneously coated with a coating solution using a slide coater having plural slots.

According to the 4th aspect of this invention, there is provided the method for producing an electrode sheet having a multilayer structure of the 1st aspect, wherein the plural layers are simultaneously coated with a coating solution using a coater composed of a combination of an extrusion die having plural slots and a slide coater having plural slots.

According to the 5th aspect of this invention, there is provided the method for producing an electrode sheet having a multilayer structure of the aspect 1, wherein at least one layer of two or more layers which are simultaneously coated is a layer containing an active material and at least one layer of two or more layers is a layer containing no active material.

According to the 6th aspect of this invention, there is provided the method for producing an electrode sheet having a multilayer structure of the aspect 1 to 4, wherein the two or more layers which are simultaneously coated are three layers.

According to the 7th aspect of this invention, there is provided the method for producing an electrode sheet having a multilayer structure of the aspect 6, wherein the three electrode material layers which are simultaneously coated are coated by a coater composed of a combination of an extrusion die for coating two layers and a slide coater for coating one layer.

According to the 8th aspect of this invention, there is provided the method for producing an electrode sheet having a multilayer structure of the aspect 1 to 7, wherein the coater described in the aspect 1st to 7th has a vacuum chamber.

According to the 9th aspect of this invention, there is provided the method for producing an electrode sheet having a multilayer structure of the aspect 8, wherein the pressure in the vacuum chamber is a reduced pressure of from −1 mmaq. to −150 mmaq., in terms of water column against a room pressure.

According to the 10th aspect of this invention, there is provided the method for producing an electrode sheet having a multilayer structure of the aspect 2, wherein the viscosities of the coating solution are from 1 mPa to 3,000 mPa.

According to the 11th aspect of this invention, there is provided the method for producing an electrode sheet having a multilayer structure of the aspect 3, wherein the viscosities of the coating solution are from 0.1 mPa to 500 mPa.

According to the 12th aspect of this invention, there is provided the method for producing an electrode sheet having a multilayer structure of the aspect 4, wherein the viscosity of the coating solution in the extrusion die are from 1 mPa to 3,000 mPa and the viscosity of the coating solution in the slide coater is from 0.1 mPa to 500 mPa.

DETAILED DESCRIPTION OF THE INVENTION

Then, the present invention is described in detail.

As a means for simultaneously coating plural layers, an extrusion die, a slide coater, or a coater combined with an extrusion die and a slide coater can be used. The coating solution of each layer measured and sent to each of the plural slots of the coater can be simultaneously coated in a multilayer structure on a base material sheet continuously supplied passing through a definite gap between the coater and a coating roller, whereby a uniform film having a multi-layer structure is obtained without mixing the layers.

Figure 1:
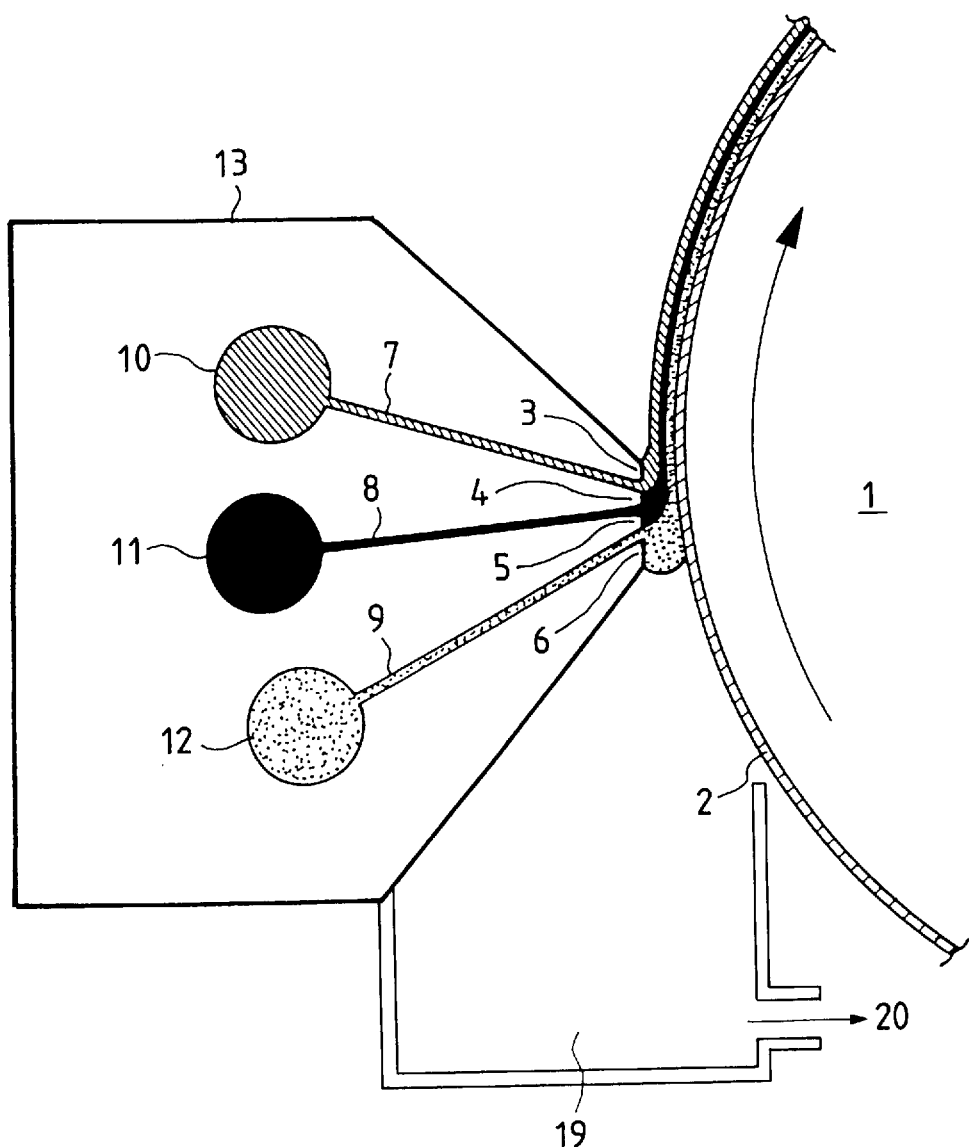
FIG. 1 is a cross sectional view showing an embodiment of the extrusion die being used in this invention.

An embodiment of the extrusion die 13 being used in this invention is shown in FIG. 1 as the cross sectional view. As shown in FIG. 1, plural lips 3, 4, 5, and 6 are confronted with a gap between them to form slots 7, 8, and 9 and the extrusion die 13 has in the inside thereof liquid storages 10, 11, and 12 connected to the slots. A definite amount of each of the coating solution for the electrode material is supplied in the liquid storage from a liquid-supplying equipment disposed outside the extrusion die and further, passes through each of the slots 7, 8, and 9 connected to the storages, and discharges from the slot outlet.

The coating solution for the electrode material is supplied from a solution-supplying equipment disposed outside the coater and the amount to be coated on the base material sheet is decided by the supplying amount of the coating solution supplied from the liquid-supplying equipment and the established value of the running speed of the base material sheet. Accordingly, the precision of the coating amount depends upon the precision of a metering pump. It is preferred that the precision of the metering pump is controlled within the error of less than 1 ml/minute.

The coating system of the present invention differs from a doctor blade coating system having a blade in view of the point described above.

The slot outlets are disposed such that a gap is kept between a base material 2 running along the surface of a coating roller 1 and the slot outlets, and the coating solution for the electrode material discharged from the slot outlets are coated on the base material 2 in layers while forming a bead between the lips and the base material 2.

For stably forming the bead, it is preferred that the coater in this invention has a vacuum chamber 19. The vacuum chamber 19 has a suction portion connecting a vacuum pump 20 at the side wall thereof as shown in FIG. 1 as the cross sectional view and the reduced pressure in the vacuum chamber against a room pressure is from −1 mmaq. to −150 mmaq. in terms of water column. The reduced pressure over −150 mmaq. in terms of water column is undesirable since the uniformity of coating is deteriorated and the coating solution flows backward in the vacuum chamber.

The base material sheet is the support for the positive electrode or the negative electrode, that is, a current collector and as the material, aluminum, stainless steel, nickel, titanium, or the alloy thereof is used for the positive electrode, and copper, stainless steel, nickel, titanium or the alloy thereof is used for the negative electrode. As the form of the base material sheet, there are a foil, an expanded metal, a punching metal, and a wire gauze. It is particularly preferred to use an aluminum foil for the positive electrode and a copper foil for the negative electrode. Furthermore, a sheet obtained by vapor-depositing the foregoing metal on the surface of a non-electric conductive polymer film, a paper, etc., or coating a layer containing carbon on the foregoing polymer film, a paper to provide an electric conductive property may be used. The thickness of the base material sheet is preferably from 5 $\mu$m to 50 $\mu$m.

The running speed of the base material sheet is preferably from 0.5 meter/minute to 50 meters/minute, and particularly preferably from 2 meters/minute to 30 meters/minute.

In the present invention, the largest coating amount of the electrode material layer reaches 1,000 ml/m$^2$ and 600 $\mu$m as the dry layer thickness, if coating is ununiform, the wholly smooth electrode cannot be obtained and at running, troubles such as cutting, etc., by strain are liable to occur, and thus the high-precision coating system of this invention is most suitable.

In the present invention, as the coated layers, there are a layer containing an active material and a layer containing no active material and it is preferred that the layer containing an active material is coated on one surface of the conductive base material sheet at a dry layer thickness of from 10 $\mu$m to 300 $\mu$m. Also, it is preferred that the layer containing no active material is coated at a dry layer thickness of from 1 $\mu$m to 50 $\mu$m. It is particularly preferred that the layer containing no active material may be constituted by two layers.

The total coating amounts of the layer containing an active material and the layer containing no active material is preferably from 60 ml to 1,000 ml per 1 m$^2$ of one surface of the base material sheet and it is preferred that the die of each layer coats from 2 ml to 500 ml of the coating solution.

The concentration of the solid components of the layer containing an active material is preferably from 20% by weight to 80% by weight, and particularly preferably from 30% by weight to 75% by weight. Also, the concentration of the solid components of the layer containing no active material is preferably from 3% by weight to 70% by weight, and particularly preferably from 5% by weight to 60% by weight.

The viscosity of the coating solution for electrode material being coated by the foregoing extrusion die is in the range of preferably from 1 mPa (millipascal) to 3,000 mPa, and more preferably from 10 mPa to 2,000 mPa at 25° C. and a shear rate of 100 sec$^{-1}$ measured by a sensor MV-DIN, Type VT 550, manufactured by HAAKE Co. If the viscosity of the coating solutions for electrode material is more than 3,000 mPa, stripes are liable to form on the coated layers, while if the viscosity of the coating solution for electrode material is lower than 1 mPa, stripes and unevenness are liable to form.

Figure 2:
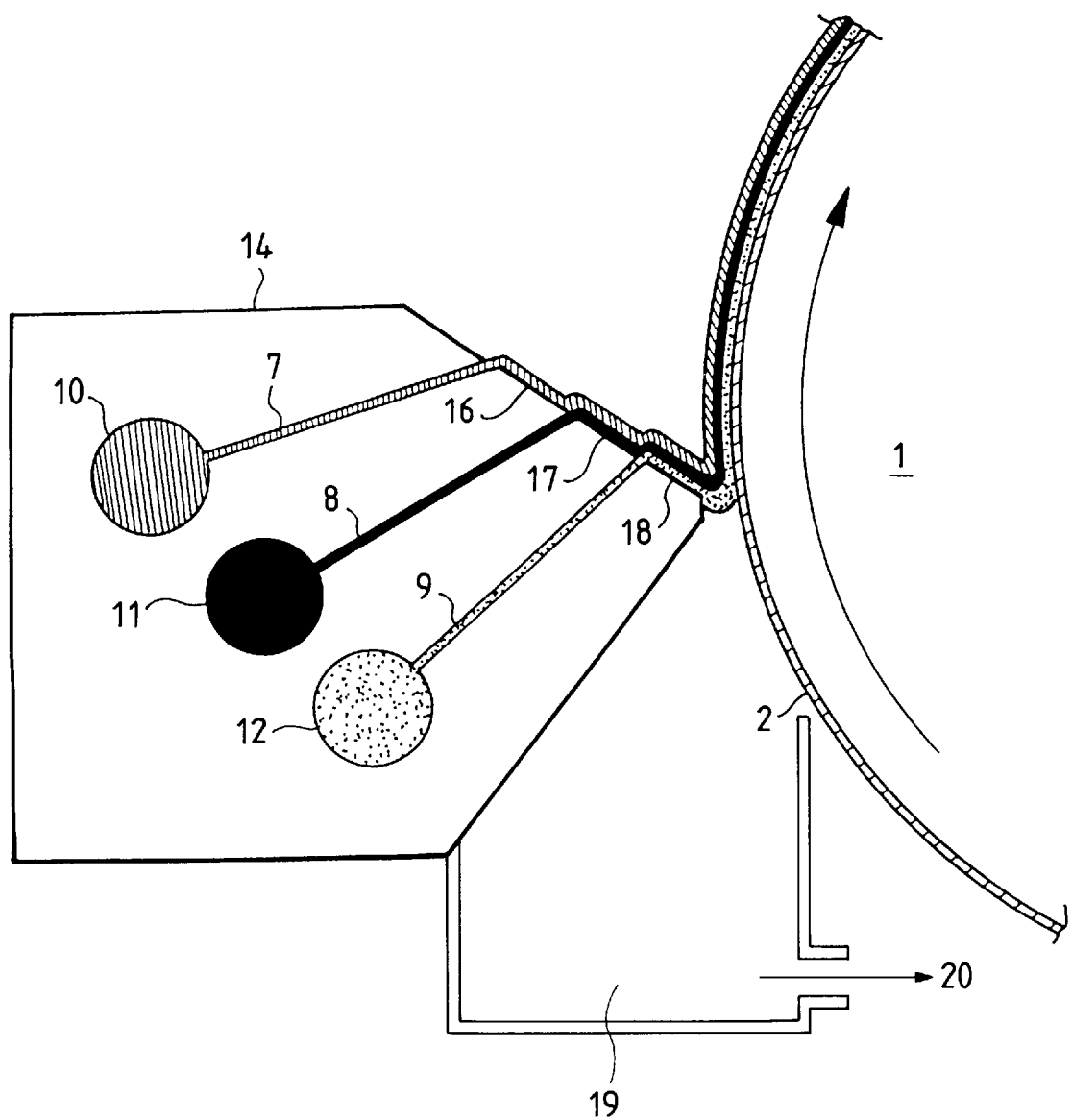
FIG. 2 is a cross sectional view showing an embodiment of the slide coater being used in this invention.

Also, in the present invention, a slide coater 14 can be used. As shown in FIG. 2, the slide coater 14 has liquid storages 10, 11, and 12, slots 7, 8, and 9, and slide portions 16, 17, and 18. A definite amount of each of coating solutions for an electrode material is supplied to each of liquid storages 10, 11, and 12 from a liquid-supplying equipment disposed outside the slide coater, passes through each slot connected to each liquid storage and discharges from each slot outlet. The coating solution for electrode material discharged from the outlet of the slot 7 flows down while forming a liquid film on the slide portion 16. The liquid film flowing down along the surface of the slide portion 16 is superposed on a liquid film of a coating solution for electrode material discharged from the slot 8 and flows down along the surface of the slide portion 17 while forming liquid films in layers with the coating solution discharged from the slot 8. The liquid films in layers flowing down along the surface of the slide portion 17 are further superposed on a coating solution for electrode material discharged from the slot 9 at the outlet portion of the slot 9 and thus superposed liquid films in three layers flow down along the surface of the slide portion 18. The end portion of the slide portion 18 is disposed such that a gap is kept between the end portion and a base material 2 running along the surface of a coating roller 1 and the coating solutions for electrode material flowed down along the slide portion 18 in layers are coated on the base material 2 while forming a bead between the end portion of the slide portion and the base material 2.

The viscosity of the coating solutions being used in the slide coater is preferably from 0.1 mPa to 500 mPa (more preferably 4 mPa to 450 mPa, most preferably 40 mPa to 400 mPa) according to the measurement method described above. If the viscosity of the coating solutions for electrode material is more than 500 mPa, belt-shaped unevenness (stage unevenness) is formed in the width direction of the coated layers. Also, if the viscosity of the coating solution for electrode material is lower than 0.1 mPa, stripes and unevenness are formed. Also, when the viscosity difference between the layer and an adjacent upper layer is large, a part of the upper layer returns to the end portion side of the slide portion, whereby layers having a desired thickness cannot be coated.

Figure 3:
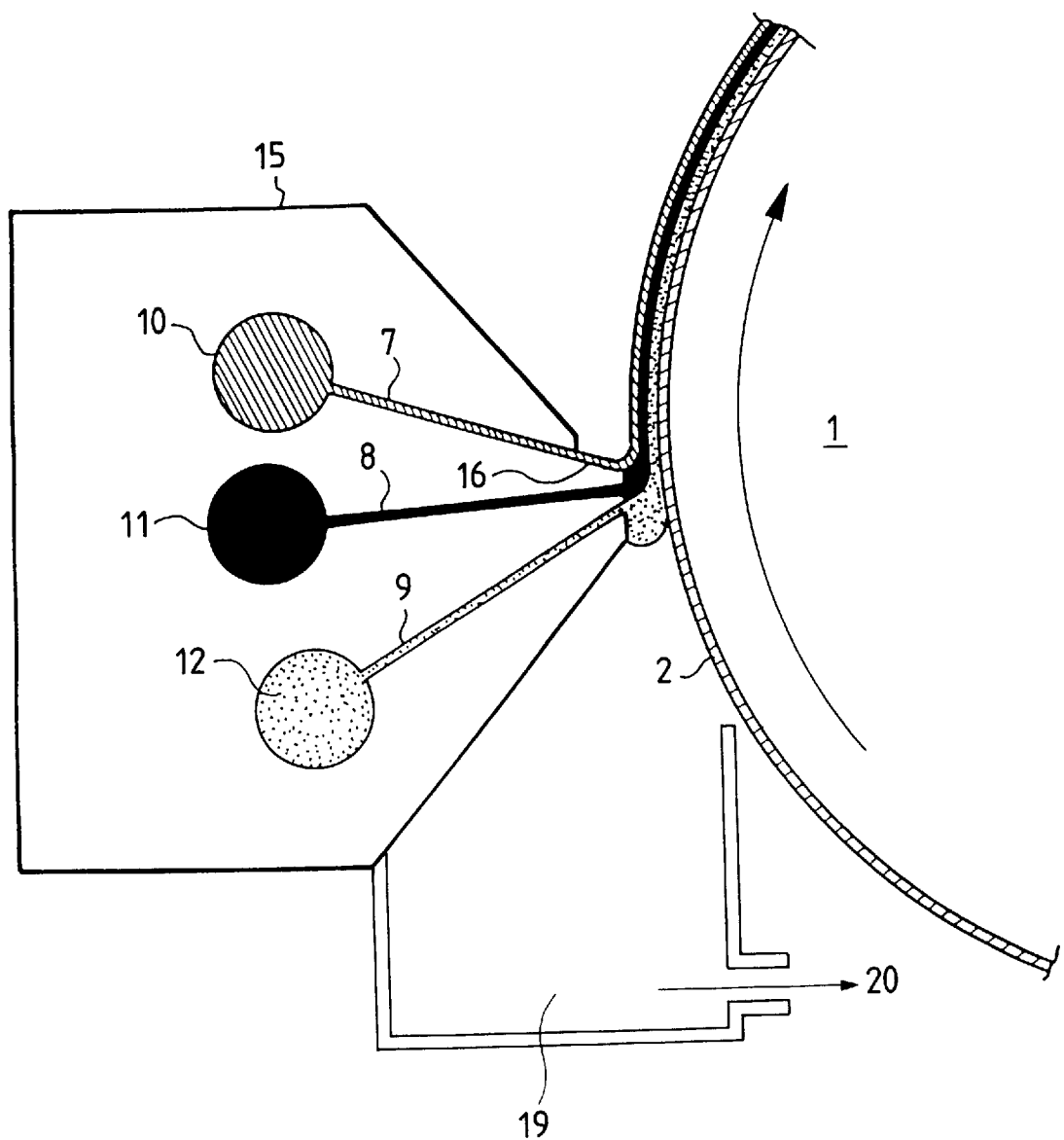
FIG. 3 is a cross sectional view showing an embodiment of the coater composed of a combination of an extrusion dye and a slide coater being used in this invention.

In the present invention, a coater 15 composed of a combination of an extrusion die and a slide coater can be used. An embodiment of the coater composed of a combination of an extrusion die and a slide coater is shown in FIG. 3 but the invention is not limited by the embodiment.

Coating solutions for electrode material are discharged from the slots 8 and 9 of the extrusion die and coated on a base material 2 continuously run while forming a bead between the end portion of the lips of the extrusion die portion and the base material 2. A coating material for electrode material discharged from the slot 7 of a slide coater portion flows down along the surface of a slide portion 16 while forming a liquid film on the slide portion and while superposing on the bead formed by the coating solution for electrode material discharged from the slots of the extrusion die portion at the end portion of the slide portion 16, a multilayer film is coated in three layers on the base material 2.

The viscosity of the coating solutions for electrode material in the extrusion die portion follows the restrictions of the coating solutions in the extrusion die described above and the viscosity of the coating solution(s) in the slide coater portion follow the restriction of the coating solutions in the slide coater.

In the present invention, the active material is a material for carrying out the electrode reaction and is a conventionally known material. In a lithium secondary battery, as typical examples of the positive electrode active material, there are a lithium-cobalt composite oxide and lithium-manganese composite oxide and as typical examples of the negative electrode active material (the material is sometimes called an active material-retaining material, an active material precursor, or simply a negative electrode material), there are carbon materials such as graphite, etc., and the composite oxide of tin, etc. These active materials are described in JP-A-7-288123, JP-A-8-130011, JP-A-8-130036, JP-A-8-236158 (the term "JP-A" as used herein means an "unexamined published Japanese patent application").

The layer containing active material is used for various purposes and according to the purpose, the disposed position and the layer thickness of the layer differ. For example, in the case of the under coating layer for improving the adhesive between the layer containing an active material layer and the base material sheet and the electric conductive property, the layer containing no active material is formed between the base material sheet and the layer containing active material and according to the purposes, the mixed amounts of the binder (e.g., adhesive) for improving the adhesion and the electric conductive material are decided. A protective layer for physically or chemically protecting the layer containing an active material is formed at the outside of the layer containing an active material. As the case may be, the protective layer may be composed of plural layers each having a different composition according to the property of the layer containing an active material. In addition to the under coating layer and the protective layer, there are intermediate layers formed between plural layers containing an active material. Since the layer containing no active material essentially reduces the capacity of a battery, it is desirable that the thickness of the layer containing active material is as thin as possible.

Accordingly, the typical form of the electrode sheet of this invention is the form that on the both surfaces of the base material sheet composed of a very thin metal foil are coated the layer containing an active material having the dry thickness same as or several times the thickness of the base material sheet and a thin layer containing no active material. The materials forming the coating solution are described in the patent publications described above.

EXAMPLES

Then, the invention is described in more detain by the following examples but the invention is not limited by these examples within the scope of this invention.

[Positive Electrode 1]

A mixture of 61 parts by weight of $LiCoO_2$ as a positive electrode active material, 2 parts by weight of acetylene black as an electric conductive agent, 24 parts by wight of carboxymethyl cellulose (1.2% solution), 2 parts by weight of Nipol 1820B (trade name, made by Nippon Zeon Co., Ltd., 55% solution) as a binder, and 12 parts by weight of water was kneaded and dispersed to provide a slurry of a coating solution for a positive electrode material. Also, a mixture of 32 parts by weight of alumina, 21 parts by weight of carboxymethyl cellulose (2% solution), 1 part by weight of a surface active agent (10% solution), and 46 parts by weight of water was dispersed to provide a coating solution for a protective layer. A coating solution for positive electrode material as the 1st layer (lower layer) and a coating solution for a protective layer as a 2nd layer (upper layer) were coated using an extrusion die. The viscosity of the coating solution for positive electrode material was 610 mPa, that of the coating solution for protective layer was 95 mPa, and the coating amounts were 330 ml/m$^2$ for the 1st layer and 61 ml/m$^2$ for the 2nd layer.

[Positive Electrode 2]

A coating solution for a positive electrode material was prepared by the same manner as in [Positive Electrode 1]. Also, a mixture of 32 parts by weight of alumina, 21 parts of carboxymethyl cellulose (2% solution), 2 parts by weight of PVDF, 1 part by weight of a surface active agent (10% solution), and 44 parts by weight of water was dispersed to provide a coating solution for a protective layer. The coating solution for positive electrode material as the 1st layer (lower layer) and the coating solution for protective layer as the 2nd layer (lower layer) were coated using an extrusion die.

The viscosity of the coating solution for the positive electrode material was 610 mPa and the coating solution for the protective layer was 150 mPa, and the coating amounts were 330 ml/m² for the 1st layer and 61 ml/m² for the 2nd layer.

[Positive Electrode 3]

A coating solution for the positive electrode material was prepared by the same manner as in [Positive Electrode 1]. Also, a mixture of 32 parts by weight of zirconium oxide, 21 parts by weight of carboxymethyl cellulose (2% solution), 1 part by weight of a surface active agent (10% solution), and 46 parts by weight of water was dispersed to provide a coating solution for a protective layer. The coating solution for positive electrode material as the 1st layer (lower layer) and the coating solution for protective layer as the 2nd layer (upper layer) were coated by an extrusion die.

The viscosity of the coating solution for positive electrode material was 610 mPa and the viscosity of the coating solution for protective layer was 90 mPa. The coating amounts were 330 ml/m² for the 1st layer and 61 ml/m² for the 2nd layer.

[Positive Electrode 4]

A coating solution for the positive electrode material was prepared by the same manner as in [Positive Electrode 1]. Also, a mixture of 32 parts by weight of titanium oxide, 21 parts by weight of carboxymethyl cellulose (2% solution), 1 part by weight of a surface active agent (10% solution), and 46 parts by weight of water was dispersed to provide a coating solution for the protective layer. The coating solution for positive electrode material as the 1st layer (lower layer) and the coating solution for protective layer as the 2nd layer (upper layer) were coated using an extrusion die.

The viscosity of the coating solution for positive electrode material was 610 mPa and the viscosity of the coating solution for protective layer was 5 mPa. The coating amounts were 330 ml/m² for the 1st layer and 61 ml/M² for the 2nd layer.

[Positive Electrode 5]

A coating solution for the positive electrode material was prepared by the same manner as in [Positive Electrode 1]. A mixture of 36 parts by weight of alumina, 1 part by wight of Kezjen Black (manufactured by Lion Akzo Co., Ltd.), 36 parts by weight of CMC (2% solution), and 27 parts by weight of water was dispersed to provide a coating solution for an intermediate layer. In this case, three layers were simultaneously coated using the coater composed of the combination of an extrusion due (1st layer and 2nd layer) and a slide coater [3rd layer(the uppermost layer)] as shown in FIG. 3. The coating solution for positive electrode material was supplied for the 1st layer and the 3rd layer and the coating solution for intermediate layer was supplied for the 2nd layer. In this case, 1 part by weight of a surface active agent (10% solution) was further added to the coating solution for the positive electrode material of the 3rd layer.

The viscosities and the coated amounts of the coating solution were 610 mPa, 110 ml/m² for the 1st layer, 430 mPa, 73 ml/m² for the 2nd layer, and 500 mPa, 220 ml/m² for the 3rd layer, respectively.

[Positive Electrode 6]

A coating solution for the positive electrode material and a coating solution for the intermediate layer were prepared by the same manners as in [Positive Electrode 5]. In this case, however, water was further added to the coating solution for intermediate layer to reduce the viscosity thereof to 20 mPa. Three coating solutions were simultaneously coated using an extrusion die as in [Positive Electrode 5]. In this case, the thickness of the 2nd layer was thinner than that of [Positive Electrode 5] since the coating solution was diluted with water.

[Comparative Electrode 1]

A coating solution for the positive electrode material was prepared by the same manner as in [Positive Electrode 1]. The coating solution for positive electrode material was coated on a base material at a coated amount of 330 ml/m², after drying, the coated base material thus coated was wound, and by sending out the base material, the coating solution for protective layer was coated at a coated amount of 61 ml/m².

[Comparative Electrode 2]

A coating solution for the positive electrode material and a coating solution for the intermediate layer were prepared by the same manners as in [Positive Electrode 5]. In this case, water was further added to the coating solution for intermediate layer to reduce the viscosity to 0.5 mPa. Then, three coating solutions were simultaneously coated as in [Positive Electrode 5]. In this case, however, the thickness of the 2nd layer was thinner than that in [Positive Electrode 5] since the coating solution for the 2nd layer was diluted with water.

[Comparative Positive Electrode 3]

A coating solution for the positive electrode material and a coating solution for the intermediate layer were prepared by the same manners as in [Positive Electrode 2]. In this case, in the coating solution for positive electrode material for the 3rd layer, the added amount of water was previously reduced and after adding a surface active agent, the viscosity was controlled to 800 mPa. The three coating solutions were coated by the same manner as in [Positive Electrode 2] and the coated amounts were also same as those in [Positive Electrode 2].

[Negative Electrode 1]

A mixture of 45 parts by weight of a tin-containing composite oxide, $SnB_{0.5}Al_{0.4}P_{0.3}Cs_{0.1}O_{3.65}$ as a negative electrode active material, 7 parts by weight of graphite as an electric conductive agent, 22 parts by weight of carboxymethyl cellulose (1.2% solution), 2 parts by weight of PVDF as a binder, and 24 parts by weight of water as a solvent was kneaded and dispersed to provide a slurry of a coating solution for a negative electrode material. Then, two kinds of slurries for protective layers were prepared. That is, for the 1st protective layer, 12 parts by weight of alumina, 40 parts of carboxymethyl cellulose (2% solution), 1 part by weight of graphite, and 47 parts by weight of water were mixed and dispersed. For the 2nd protective layer as the uppermost layer, 6 parts by weight of alumina, 40 parts by weight of carboxymethyl cellulose (2% solution), 3 parts by weight of graphite, 1 part by weight of a surface active agent (10% solution), and 50 parts by weight of water were mixed and dispersed.

These coating solution prepared as described above were coated using the extrusion die as shown in FIG. 1. In this case, for the 1st layer (the lowermost layer), the coating solution for the negative electrode material, for the 2nd layer, the coating solution for the 1st protective layer, and for the 3rd layer (the uppermost layer), the coating solution for the 2nd protective layer were supplied, respectively, by metering pumps.

The viscosity of the coating solution for the negative electrode material was 280 mPa, the viscosity of the coating solution for the 1st protective layer was 130 mPa, and the viscosity of the coating solution for the 2nd protective layer was 130 mPa. The coating amounts were 120 ml/m² for the 1st protective layer, 100 ml/m² for the 2nd layer, and 20 ml/m² for the 3rd layer.

[Negative Electrode 2]

The coating solution for the negative electrode material and the coating solution for the 2nd protective layer were prepared by the same manners as in [Negative Electrode 1]. For the 1st protective layer, 14 parts by weight of alumina, 46 parts by weight of carboxymethyl cellulose (2% solution), 2 parts by weight of graphite, and 38 parts by weight of water were mixed and dispersed.

The 1st layer and the 2nd layer were coated by the extrusion die and the 3rd layer was coated by the slide coater combined with the foregoing extrusion die as shown in FIG. 3.

For the 1st layer (the lowermost layer), the coating solution for the negative electrode material, for the 2nd layer, the coating solution for the 1st protective layer, and for the 3rd layer (the uppermost layer), the coating solution for the 2nd protective layer were supplied, respectively, by metering pumps.

The viscosity of the coating solution for the negative electrode material was 280 mPa, the viscosity of the coating solution for the 1st protective layer was 220 mPa, and the viscosity of the coating solution for the 2nd protective layer was 130 mPa. The coating amounts were 120 ml/m$^2$ for the 1st protective layer, 100 ml/m$^2$ for the 2nd layer, and 20 ml/m$^2$ for the 3rd layer.

[Negative Electrode 3]

By following the same procedure as in [Negative Electrode 2] except that titanium oxide was used in place of alumina, almost the same results as in [Negative Electrode 2] were obtained.

[Comparative Negative Electrode 1]

The coating solution for the negative electrode material in [Negative Electrode 1] was coated on a base material in a coating amount of 120 ml/m$^2$, and after drying, the coated base material was wound. The coated base material thus wound was sent out again by unwinding, the coating solution for the 1st protective layer was coated thereon in a coating amount of 100 ml/m$^2$ followed by drying, and wound. Thereafter, the coated base material thus wound was sent out again by unwinding, the coating solution for the 2nd protective layer was coated at 70 ml/m$^2$ as the 3rd layer, and dried. In this case, however, the coating solution for the 2nd protective layer was diluted 3.5 times with water at use.

After spot-welding a leading plate of nickel or aluminum to the end portion of each of the foregoing negative electrodes or each of the positive electrodes, respectively, each electrode was dried by dehydrating in dry air having a dew point of −40° C. or less for one hour at 250° C.

Furthermore, the dehydrated and dried positive electrode, a fine-porous polyethylene film separator, the dehydrated and dried negative electrode, and the separator were wound in a vortex form by a winder in this order.

The wound assembly was placed in iron-made bottomed type battery can applied with nickel plating, which also functions as a negative electrode terminal. An electrolyte containing 0.9 mol of LiPF$_6$ and 0.1 ml of LiBF$_4$ per liter and composed of a mixed solution of ethylene carbonate, dimethyl carbonate, diethyl carbonate, and ethyl propionate at 2:4:3:1 by volume ratio as the solvents was injected in the battery can. Then, a battery cap having a positive electrode terminal was caulked via a gasket to prepare a cylindrical battery. In addition, the positive terminal was previously connected to the positive electrode and the battery can was previously connected to the negative electrode each by a leading terminal.

Using the positive electrode and the negative electrode described above, each battery was prepared by each of the combinations shown in Table 1 below. Also, in each of the batteries prepared, the cycle property was tested at a charging stop voltage of 4.1 volts and a discharging voltage of 2.8 volts. Also, 100 batteries were prepared for examined each kind and the number of batteries inside short-circuited. Furthermore, in [Positive Electrode 5] and [Positive Electrode 6] and [Comparative Positive Electrode 2] and [Comparative Positive Electrode 3], the coating state was observed and the surface quality after drying was confirmed. The results obtained are shown in Table 2 below.

TABLE 1

| Battery | Positive Electrode | Negative Electrode | Inside Short-circuited |
|---|---|---|---|
| Battery 1 | P.E. 1 | N.E. 1 | 0/100 OK |
| Battery 2 | P.E. 2 | N.E. 1 | 0/100 OK |
| Battery 3 | P.E. 3 | N.E. 1 | 0/100 OK |
| Battery 4 | P.E. 4 | N.E. 1 | 0/100 OK |
| Comparative Battery 1 | Comparative P.E. 1 | Comparative N.E. 1 | 9/100 NG |
| Battery 5 | P.E. 1 | N.E. 2 | 0/100 OK |
| Battery 6 | P.E. 1 | N.E. 3 | 0/100 OK |
| Battery 7 | P.E. 1 | Comparative N.E. 1 | 1/100 OK |

P.E.: [Positive Electrode]
N.E.: [Negative Electrode]
Batteries 1 to 4 and 5 to 7 are batteries of this invention.

As is apparent from the results of Table 1 described above, the batteries of the present invention has a remarkable effect for preventing the occurrence of inside short-circuited.

TABLE 2

| | Coated State, Surface Quality | |
|---|---|---|
| [Positive Electrode 2] | Uniform coated surface | o |
| [Positive Electrode 3] | Uniform coated surface | o |
| [Comparative Positive Electrode 2] | The coating solution for the 3rd layer returned to the slide portion to thin coating. | x |
| [Comparative Positive Electrode 3] | Stage-form unevenness formed in the 3rd layer. | x |

As is apparent from the results of Table 2, in the protective layer (upper layer) of the positive electrode sheet prepared in [Comparative Positive Electrode 1], many holes formed by the bubbles caused by the presence of void of the layer of the electrode material mixture.

In the electrode having the three-layer structure, a good coated surface quality was not obtained in [Comparative Positive Electrode 2] and [Comparative Positive Electrode 3], which were not simultaneously coated, while a surface quality having no problem could be obtained in [Positive Electrode 5] and [Positive Electrode 6]. Also, in the negative electrode, the same effects were obtained.

[Effect of the Invention]

In the case of using the method of this invention for producing an electrode sheet, even when the necessity of making the electrode having a multilayer structure for improving the fundamental characteristics of a battery, such as, for example, a safety, it becomes possible to simultaneously coat the plural layers, and thus even when the number of the layers necessary for constituting an electrode is increased, they can be efficiently coated without greatly prolonging the finishing time for the electrode. Furthermore, the occurrence of coating defects can be restrained and the battery performance is improved.

While the invention has been described in detail and with reference to specific embodiments thereof, it will be apparent to one skilled in the art that various changes and modifications can be made therein without departing from the spirit and scope thereof.

What is claimed is:

1. A method for producing an electrode sheet having a multilayer structure, wherein two or more layers for an electrode sheet for a nonaqueous secondary battery are simultaneously coated on one side surface of a support with a coating solution by a coater, wherein said support has a thickness of from 5 to 50 μm and comprises at least one material selected from the group consisting of aluminum, stainless steel, nickel, titanium and an alloy thereof when said support is for a positive electrode, or said support has a thickness of from 5 to 50 μm and comprises at least one material selected from the group consisting of copper, stainless steel, nickel, titanium and an alloy thereof when said support is for a negative electrode.

2. The method for producing an electrode sheet having a multilayer structure as in claim 1, wherein the layers are coated with a coating solution by using an extrusion die having plural slots.

3. The method for producing an electrode sheet having a multilayer structure as in claim 2, wherein the coating solution has a viscosity of from 1 mPa to 3,000 mPa.

4. The method for producing an electrode sheet having a multilayer structure as in claim 1, wherein the layers are coated with a coating solution by using a slide coater having plural slots.

5. The method for producing an electrode sheet having a multilayer structure as in claim 4, wherein the coating solution has a viscosity of from 0.1 mPa to 500 mPa.

6. The method for producing an electrode sheet having a multilayer structure as in claim 1, wherein the layers are coated with a coating solution by a coater composed of a combination of an extrusion die having plural slots and a slide coater having plural slots.

7. The method for producing an electrode sheet having a multilayer structure as in claim 6, wherein the coating solution in the extrusion die has a viscosity of from 1 mPa to 3,000 mPa and the coating solution in the slide coater has a viscosity of from 0.1 mPa to 500 mPa.

8. The method for producing an electrode sheet having a multilayer structure as in claim 1, wherein at least one layer of two or more layers which are simultaneously coated is a layer containing an electrode active material and at least one layer of two or more layers is a layer containing no electrode active material.

9. The method for producing an electrode sheet having a multilayer structure as in claim 1, wherein the two or more layers which are simultaneously coated are three layers.

10. The method for producing an electrode sheet having a multilayer structure as in claim 9, wherein the three electrode material layers which are simultaneously coated are coated by a coater composed of a combination of an extrusion die for coating two layers and a slide coater for coating one layer.

11. The method for producing an electrode sheet having a multilayer structure as in claim 1, wherein the coater has a vacuum chamber.

12. The method for producing an electrode sheet having a multilayer structure as in claim 11, wherein the vacuum chamber has a reduced pressure of from −1 mmaq. to −150 mmaq. in terms of water column against a room pressure.

13. The method for producing an electrode sheet having a multilayer structure as in claim 1, wherein said two or more layers comprise a layer containing an electrode active material and having a thickness of from 10 μm to 300 μm and a layer containing no electrode active material and having a thickness of from 1 μm to 50 μm.

14. The method for producing an electrode sheet having a multilayer structure as in claim 1, wherein said two or more layers comprise a layer containing an electrode active material and having a solid component concentration of from 20% by weight to 80% by weight and a layer containing no electrode active material and having a solid component concentration of from 3% by weight to 70% by weight.

* * * * *